United States Patent

Libert et al.

Patent Number: 5,857,055
Date of Patent: Jan. 5, 1999

[54] METHOD OF IMPARTING SURPLUS LENGTH TO OPTICAL FIBERS IN A PROTECTIVE METAL TUBE AND A LINE FOR IMPLEMENTING THE METHOD

[75] Inventors: Jean-François Libert, Pont De Briques; Renaud Le Gac, Calais; Walter Comello, Frethun, all of France

[73] Assignee: Alcatel Submarine Networks, Clichy, France

[21] Appl. No.: 904,016

[22] Filed: Jul. 31, 1997

[30] Foreign Application Priority Data

Aug. 1, 1996 [FR] France .................................. 96 09723

[51] Int. Cl.[6] ...................................................... G02B 6/36
[52] U.S. Cl. ............................................. 385/147; 29/860
[58] Field of Search .............................. 29/860, 861, 862, 29/877, 878, 879; 385/147, 84, 134

[56] References Cited

U.S. PATENT DOCUMENTS 5,210,391   5/1993   Yoshie et al. ...................... 219/121.63
5,231,260   7/1993   Yoshie et al. ...................... 219/121.63

FOREIGN PATENT DOCUMENTS

0727679A1   8/1996   European Pat. Off. .
WO9101506   2/1991   WIPO .

*Primary Examiner*—Hung N. Ngo
*Attorney, Agent, or Firm*—Sughrue, Mion, Zinn, Macpeak & Seas, PLLC

[57] ABSTRACT

The optical fibers are enclosed in a protective metal tube in such manner as to impart surplus length to them, the tube being shaped from an initial strip, then laser welded, and optionally swaged as it advances in line. The method of obtaining the surplus length of a predetermined value consists in subjecting the tube as driven to subsequent stretching of a predetermined value by means of a capstan working at constant torque, thereby causing the fibers to advance in the welded tube, then in relaxing the stretched tube. Application to a line for enclosing optical fibers in a protective tube.

6 Claims, 1 Drawing Sheet

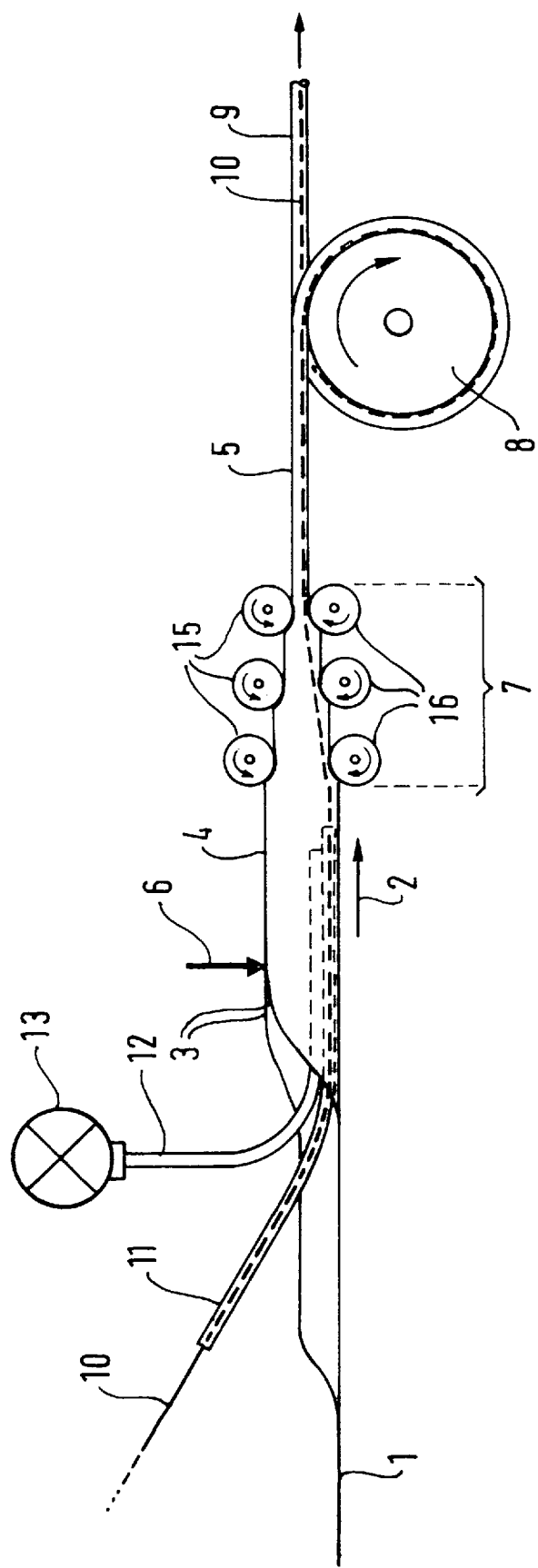

METHOD OF IMPARTING SURPLUS LENGTH TO OPTICAL FIBERS IN A PROTECTIVE METAL TUBE AND A LINE FOR IMPLEMENTING THE METHOD

The present invention relates to a method of imparting surplus length to optical fibers in a protective metal tube, and a line for implementing the method.

BACKGROUND OF THE INVENTION

Generally, in known manner, one or more optical fibers enclosed in a protective metal tube are organized such that they have a surplus length in the tube, and they are embedded in a filler material. The surplus length prevents the fibers from being subjected to unwanted stresses that might be detrimental to good transmission quality of the optical signals transmitted in the fibers. The surplus length must not however be too great in order to avoid the risks of the fibers bending excessively in the protective tube, which is likewise detrimental to the transmission quality of the optical signals.

The protective metal tube for protecting the fibers is made continuously from an initial strip progressively deformed into a tube which is then closed lengthwise by laser welding, as the strip and the resulting tube advance along a line for enclosing the fibers in the tube. The fibers are inserted into the protective tube via guide tubes which are engaged in the protective tube before it is closed and which extend in the tube beyond the point along the line at which the tube is laser welded. The welded protective tube is usually swaged to a give it a desired final diameter that is as small as possible, and to perfect its shape. It is also cooled directly after it has been laser welded or after it has been swaged.

Document WO 91/01506 describes such a line for enclosing optical fibers in a protective metal tube, and it discloses a method and means for controlling the surplus length of the fibers in the protective tube. For this purpose, the fibers are inserted into the guide tubes and via said guide tubes into the protective tube at an insertion speed that is controlled in real time. The insertion speed is controlled on the basis of instantaneous measurements of the traction force exerted on the protective tube to advance it along the line, of the speed of advance of the protective tube, and of the temperature thereof, so as to obtain a predetermined ratio between the length of the protective tube and the length of the optical fibers in the tube.

The instantaneous measurements of the speed of the protective tube and of the temperature thereof are taken after it has been swaged. The instantaneous measurement of the traction force is taken by a sensor associated with a traction capstan driven by a self-starting synchronous motor. The various instantaneous values are transmitted to a control unit. The control unit has previously received from an operator the information relating in particular to the desired surplus length of the fibers in the protective tube, to the coefficient of expansion of the metal of the tube, its modulus of elasticity, and to the geometrical shape of the tube. By means of a pre-established program, it determines accordingly the instantaneous value of the insertion speed of the fibers, which is transmitted to a self-starting synchronous motor for controlling the means for inserting the fibers, such as a linear capstan for inserting the fibers into the guide tubes.

The means disclosed in that document are relatively complex. They do not always make it possible to impart a surplus length to the fibers that is uniform and that is accurate enough in the protective metal tube formed. In particular, the surplus length imparted is related to the swaging rate implemented, and to the precise characteristics and type of the tube, which affect the traction force and can give rise to inaccuracies of various sizes in the real surplus length obtained.

OBJECTS AND SUMMARY OF THE INVENTION

An object of the present invention is to solve the above-mentioned problems very simply and reliably so as to impart real surplus length to the fibers that is uniform and that is set very accurately.

The invention provides a method of enclosing optical fibers in a protective metal tube in such manner as to impart surplus length to them, said method consisting in shaping an initial metal strip into a tube, in welding the tube to seal it, in simultaneously driving in line the initial strip and the shaped and welded tube, and in inserting at least one optical fiber into the shaped and welded tube and causing it to advance therein while imparting a desired surplus length to each optical fiber, said method consisting in subjecting the tube as welded and driven in line to subsequent stretching of a predetermined value, in causing each optical fiber to advance in said tube at the linear speed of advance of the stretched tube, then in allowing the stretched tube to relax, so as to obtain the desired surplus length, which is equal to said predetermined value, in the relaxed tube.

Advantageously, said stretching is performed by applying a traction force that is constant and predetermined to the tube as driven in line.

Preferably, said tube is also swaged prior to being stretched, the stretching elongation being independent of the swaging rate implemented.

The invention also provides a line for enclosing optical fibers in a protective metal tube, the line implementing the method according to claim 1, and including shaping means for deforming said strip into a tube, means for sealing the shaped tube by welding, means for inserting each optical fiber into said tube as shaped and welded, means for advancing each optical fiber, and in-line advancing means for advancing the strip and the shaped and welded tube in line, said line including a capstan mounted downstream from said in-line advancing means, working at constant torque, and receiving said tube, so as to constitute stretching means for stretching the tube by a predetermined value, and for enabling the stretched tube to relax as it leaves the capstan, and so as simultaneously to constitute said means for advancing each optical fiber and to impart surplus length of said predetermined value to it in the tube as relaxed.

Advantageously, said in-line advancing means are constituted by a series of motor-driven swaging wheels so that said subsequent elongation by said predetermined value can be obtained regardless of the swaging rate implemented.

In a variant, said in-line advancing means are associated with swaging means, all of these means being mounted upstream from said capstan so that said subsequent elongation by said predetermined value can be obtained regardless of the swaging rate implemented.

BRIEF DESCRIPTION OF THE DRAWING

The characteristics and advantages of the present invention appear from the following description of an embodiment given by way of preferred example and with reference to the sole figure of the accompanying drawing.

The sole figure diagrammatically shows a line for enclosing optical fibers in a protective metal tube, with surplus length being imparted to the fibers by implementing the invention.

MORE DETAILED DESCRIPTION

In the sole figure, reference 1 designates a metal strip that is progressively deformed into a tube by known means (not shown), the tube being closed in sealed manner by laser welding, and then being swaged, as the strip and the resulting tube advance in the direction indicated by arrow 2 along a line for enclosing optical fibers in a tube. Reference 3 designates the still open tube just before it is closed completely, reference 4 designates the tube after it has been welded hermetically, but before it is swaged, and reference 5 designates the tube just after it has been swaged. Arrow 6 indicates the laser welding operation performed under the arrow at the corresponding point along the line. Reference 7 designates the swaging station through which the welded tube 4 advances, and reference 8 designates a traction capstan for pulling the swaged tube 5. Reference 9 designates the protective metal tube just downstream from the traction capstan.

One or preferably a plurality of transmission optical fibers 10 are enclosed in the protective tube as said tube is welded in sealed manner. For this purpose, for each fiber, a capillary guide tube 11 is engaged in the still open tube 3, and extends inside the hermetically laser welded but not yet swaged tube 4.

In parallel, another auxiliary tube 12 for injecting filler material is also engaged in the still open tube and extends inside the welded but not swaged tube 4. It is connected to a filler material injection pump 13. The filler material is injected in controlled manner, as is known but not described because it lies outside the present invention, so as to fill the final tube 9 satisfactorily.

According to the present invention, the fibers are enclosed in the protective tube with a uniform surplus length of pre-established value being obtained by the combined action of the swaging means and of the means for advancing the welded tube along the line, which means are constituted respectively by pairs of motor-driven swaging wheels such as 15 and 16, and by the capstan 8 which works at constant torque.

The pairs of motor-driven wheels 15 and 16 are chosen such that they swage the tube 4 by a desired swaging rate. They are driven at a speed that is chosen to obtain the desired speed of in-line advance of the strip 1 and of the welded tube 4 in the direction indicated by arrow 2. The capstan is rotated so as to stretch the swaged tube 5, thereby imparting a given amount of elongation to the tube as the tube 5 engages the capstan, and therefore imparting the corresponding given surplus length to the fibers in the tube 9 which relaxes as soon as it leaves the capstan 8.

In particular, the swaging rate may be zero, in which case the motor-driven wheels merely serve to advance the tube in line in the direction indicated by arrow 2.

The speed with which the fibers are inserted into the capillary guide tubes 11 is given by the linear speed of the swaged tube 5 which is stretched on engaging the capstan. It results from the fibers being applied against the inside face of the tube 5, which is pressed against the capstan, and thus causes the fibers to advance at the speed of the swaged tube.

The surplus length of the fibers in the relaxed final protective tube 9 is regulated by causing the capstan to work at constant torque of predetermined value chosen to obtain the desired elongation of the tube 5, and the inverse relaxation of the tube 9. This predetermined value of the torque is defined as a function of various parameters relating to the protective tube, in particular the type and the geometrical shape thereof, and to the fibers, in particular the number of fibers and the fiber diameter. It defines the constant traction force exerted on the already swaged tube to obtain the desired elongation of the tube, and therefore the desired resulting surplus length of the fibers in the swaged but relaxed tube.

This mode of imparting surplus length to the fibers by elongating the swaged tube is independent of the swaging rate of the tube. The surplus length is regulated only by causing the capstan to work at constant and predetermined torque, so that the tube, which has already been driven to advance it in line and to swage it, is subjected to a traction force that is constant and predetermined. The elongation of the tube, i.e. the surplus length of the fibers in the relaxed tube is thus uniform over its entire length. The value of the torque is set to obtain the desired value for the surplus length.

In the preferred embodiment shown and described above, the swaging station is constituted by a series of pairs of motor-driven wheels. The pairs of motor-driven wheels used define the desired swaging rate. This rate can be set at will depending on the pairs of wheels used in the series. It should also be noted that the two wheels in each pair are shown as being motor-driven, but it is possible for only one of the two wheels to be motor-driven, the other being free to rotate.

In a variant, it is also indicated that the swaging station may comprise one or more conventional swaging dies and associated downstream traction means for advancing the tube through the die(s). As above, such a swaging station is followed by the above-mentioned capstan 8 working at constant torque relative to the traction means then associated with the die(s). The line implemented in such a variant remains relatively simple, its swaging station being significantly longer and less compact than the station comprising motor-driven wheels only.

We claim:

1. A method of enclosing optical fibers in a protective metal tube in such manner as to impart surplus length to them, said method consisting in shaping an initial metal strip into a tube, in welding the tube to seal it, in simultaneously driving along in line the initial strip and the shaped and welded tube, and in inserting at least one optical fiber into the shaped and welded tube and causing it to advance therein while imparting a desired surplus length to each optical fiber, said method consisting in subjecting the tube as welded and driven in line to subsequent stretching of a predetermined value, in causing each optical fiber to advance in said tube at the linear speed of advance of the stretched tube, then in allowing the stretched tube to relax, so as to obtain the desired surplus length, which is equal to said predetermined value, in the relaxed tube.

2. A method according to claim 1, consisting in performing said stretching by applying a traction force that is constant and predetermined to the tube as driven in line.

3. A method according to claim 1, consisting in swaging said welded tube prior to said stretching, the elongation of said tube on being stretched being independent of the swaging rate implemented.

4. A line for enclosing optical fibers in a protective metal tube, the line implementing the method according to claim 1, and including shaping means for deforming said strip into a tube, means for sealing the shaped tube by welding, means for inserting each optical fiber into said tube as shaped and welded, means for advancing each optical fiber, and in-line advancing means for advancing the strip and the shaped and welded tube in line, said line including a capstan mounted downstream from said in-line advancing means, working at constant torque, and receiving said tube as welded and driven in line, so as to constitute stretching means for stretching the tube by a predetermined value, and for enabling the stretched tube to relax as it leaves the capstan, and so as simultaneously to constitute said means for advancing each optical fiber and to impart surplus length of said predetermined value to it in the tube as relaxed.

5. A line according to claim 4, wherein said in-line advancing means are constituted by a series of motor-driven simultaneous swaging wheels so that the swaged tube can be subsequently elongated by said predetermined value regardless of the swaging rate implemented by said wheels.

6. A line according to claim 4, wherein said in-line advancing means are mounted between swaging dies and said capstan so that the swaged tube can be subsequently elongated by said predetermined value regardless of the swaging rate implemented by said dies.

* * * * *